United States Patent [19]

Bourgeois

[11] Patent Number: 5,154,565
[45] Date of Patent: Oct. 13, 1992

[54] PROCESS AND APPARATUS FOR THE LIFTING AND RETRACTING OF A USUALLY HORIZONTAL PLATFORM

[76] Inventor: Jacques Bourgeois, Route de Dampierre, 58310 Saint-Amand-en-Puisaye, France

[21] Appl. No.: 595,285

[22] Filed: Oct. 10, 1990

[30] Foreign Application Priority Data

Oct. 12, 1989 [FR] France .................. 89 13470

[51] Int. Cl.$^5$ .............................................. B60P 1/44
[52] U.S. Cl. .................................... 414/539; 414/545; 414/786
[58] Field of Search ............ 414/539, 540, 545, 556, 414/557, 786, 462, 465, 466

[56] References Cited

U.S. PATENT DOCUMENTS

| | | | |
|---|---|---|---|
| 2,418,494 | 4/1947 | Anthony et al. | 414/545 X |
| 2,498,161 | 2/1950 | Hamilton | 414/545 |
| 2,501,112 | 3/1950 | Webster | 414/547 |
| 3,779,406 | 12/1973 | Hermann | 414/557 |
| 4,015,725 | 4/1977 | Ryan et al. | 414/539 |
| 4,392,771 | 7/1983 | Smalley | 414/545 |
| 4,456,421 | 6/1984 | Robson | 414/546 |
| 4,579,500 | 4/1986 | Robinson | 414/545 |
| 4,741,660 | 5/1988 | Kent | 414/540 X |
| 5,011,361 | 4/1991 | Peterson | 414/545 X |
| 5,026,244 | 6/1991 | Dorn | 414/540 |

FOREIGN PATENT DOCUMENTS 0049582 4/1982 European Pat. Off. .

Primary Examiner—David A. Bucci
Attorney, Agent, or Firm—Sandler, Greenblum & Bernstein

[57] ABSTRACT

Process and apparatus for lifting and retracting of a power tailgate platform held laterally by one of its sides by an operative arm. During a first phase, the platform is raised laterally by swivelling around an originally horizontal lifting axle, from a horizontal operative position to an intermediate vertical position, and then, in a second phase, the platform and its lifting axle are swivelled around a retracting axle that is fitted at right angles to the operative arm and arranged at an angle in relation to the lifting axle, preferably at 90° to the latter, in such a way that the platform reaches a vertical storage position.

24 Claims, 1 Drawing Sheet

PROCESS AND APPARATUS FOR THE LIFTING AND RETRACTING OF A USUALLY HORIZONTAL PLATFORM

BACKGROUND OF THE INVENTION

1. Field of the Invention

This invention relates to a process and apparatus for the lifting and retracting of a platform particularly adapted to the field of power tailgates.

2. Discussion of Background Material

In a vehicle equipped with a tailgate or where the platform(s) are supported by just one of their sides, the lateral lifting and longitudinal retracting movements of the platform(s) in relation to the front part of the tailgate are usually carried out simultaneously by sweeping an important volume inside the vehicle which limits in the same proportion the volume available for the transport of the load. In other devices, in which lifting and retracting are no longer simultaneous, the same inconveniency is to be found; namely, the power tailgate proposed in the application for a European patent EP-0 049 582, in the name of the Company STOWALIFT LIMITED, includes a platform held by one of its sides by means of a deformable parallellogram type operative arm, and which can pass from a horizontal operative position to vertical storage position, either as a door or against the lateral wall of the vehicle equipped with said tailgate. In order to reach this last position, the platform is first raised to its vertical position outside the vehicle, then swivels with the operative arm around a vertical axle to an angle of 180°, thus sweeping a large volume inside the vehicle.

SUMMARY OF THE INVENTION

This invention intends to bring a remedy to this inconveniency in proposing a process for the lifting and retracting of a normally flat platform, for example, a tailgate, laterally maintained by one of its sides by means of an operative arm, the platform, in a first phase being raised laterally by swivelling round an originally horizontal lifting axle, from a horizontal operative position to an intermediate vertical position, and during a second phase, the platform and its lifting axle are swivelled around a retracting axle, situated at right angles to the operative arm and at an angle to the lifting axle, preferably at 90° to the latter, so that the platform reaches a vertical storage position.

When the tailgate is in combination with vehicle, the platform is raised laterally outside the vehicle, before being tipped edgeways from its intermediate vertical position towards its vertical storage position against the internal lateral wall of the vehicle on the side of which is installed the operative arm. In this way, the platform retraction is realized without reducing any of the vehicle's load capacity.

In accordance with a preferred execution of the invention, the lifting and retracting of the platform are achieved by the application of a variable force F at a point of the platform situated at a distance d1 from the lifting axle and at a distance d2 from the retracting axle such that, during the lifting phase of the platform, the moment of the force F in relation to the lifting axle is sufficient to make the platform swivel laterally, without, during the same lapse of time, the moment of this same force F in relation to the retracting axle exceeding the moment necessary for the vertical retraction of the platform and its lifting axle.

During the retraction phase, the force F is increased until it allows the rotation of the whole platform unit and its lifting axle round the retracting axle.

Of course, it is clear that the two phases of lifting and retracting result from the application of a force F always acting in the same direction; indeed, the inversion of the direction of the force F between the two phases simply causes reverse movements, i.e. the unfolding of the whole unit from the vertical storage position to the intermediate vertical position, or the tipping of the platform from this latter position to the horizontal operative position. On the other hand, during lifting and retracting operations, force F can also be directed both from top to bottom and from bottom to top, i.e. pushing or pulling. Depending on the case, the point of application of force F is situated on the side of the part of the platform that can be lowered in relation to its lifting axle during its lifting (F pushing) or from the opposite side (F pulling).

Preferably, the point of application of force F is chosen on the side of the part of the platform that is lowered in relation to its lifting axle during the lifting phase, i.e. substantially on the side where the operative arm of the platform is to be found. In this way, in its intermediate vertical position, the platform is practically attached to the operative arm. All that remains to be done is to cause its retraction edgeways towards the rear of the arm, by swivelling the whole unit around the retracting axle. For this purpose, the point of application of the force F is preferably situated on the side of the part of the platform which retracts downwards in relation to the retracting axle during the retraction phase of the whole unit, force F thus pushing.

The invention also concerns apparatus for lifting and retracting a power tailgate platform using the proposed process. The platform, usually flat, is held laterally by one of its sides by means of an operative arm, and includes two axles joined to each other at an angle, not necessarily coplanar, a first lifting axle enabling the platform to be raised laterally by swivelling round the lifting axle, from a horizontal operative position to an intermediate vertical position, and a second retraction axle, situated at right angles to the operative arm, and enabling the platform and its lifting axle to be retracted by swivelling around the retracting axle.

BRIEF DESCRIPTION OF THE DRAWINGS

Other characteristics and advantages of this invention will better appear from the description to follow of several embodiments of the apparatus in accordance with the invention, given as non-limiting examples in reference to the attached drawings, in which.

DETAILED DESCRIPTION OF THE PREFERRED EMBODIMENTS

Figure 1:
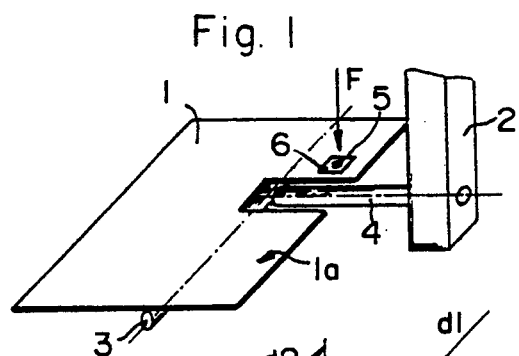
FIGS. 1 to 3 are partial perspective views of a power tailgate equipped with a platform held by one of its sides by means of a vertical operative arm, the platform equipped with a first lifting and retracting apparatus, being successively in its horizontal operative position, in its intermediate vertical position and in its vertical storage position.

In all the figures, only the active part of the power tailgate concerned in this invention is shown. Thus, the proposed power tailgate comprises a platform 1, normally flat and held laterally by one of its sides by means of an operative arm 2 responsible for lowering or raising it in relation with the ground. For example, the operative arm 2 may be a deformable parallelogram type already known in the present state of the art. The platform 1 can be directed through space from a horizontal operative position to a storage position, generally vertical, situated for example against the lateral internal wall of a vehicle, the power tailgate of which would equip the rear door. In order to do this, and in accordance with this invention, the platform 1 is born by two axles 3 and 4 joined together at angles, preferably orthogonally. The axle 3 is called a lifting axle, and permits the platform 1 to be raised laterally, by swivelling around the lifting axle 3. The other axle 4 is called a retracting axle, which is fitted at right angles to the operative arm 2. The axle 4 is used to retract the platform 1 and its lifting axle 3 through retracting them by rotation edgeways around the retracting axle 4, either towards the front or the back of the tailgate, the latter case of course being the one that corresponds to a storage of the platform 1 within the vehicle.

According to the preferred operative form of the invention, the lateral lifting and the retraction edgeways of the platform 1 are obtained by means of a variable force F which is applied at a chosen point of the platform:

on the side of the part 1a of the platform 1 which lowers in relation to its lifting axle 3 during the lifting phase, i.e. substantially on the side where the operative arm 2 is to be found. In this way, in its intermediate raised vertical position platform 1 is almost attached to the operative arm 2.

on the part 1b side of the platform 1 which retracts downwards in relation to the retracting axle during the retraction phase, edgeways, of the platform 1 and its lifting axle 3.

Under these conditions, force F pushes during the two lifting and retracting phases, and the motor unit providing this thrust can be composed, in a non-limiting way, by any jack or jack system, or their equivalent. It can be noted that should the efforts to be produced be accessible to a human being, a purely manual operation can also be considered.

Figure 2:
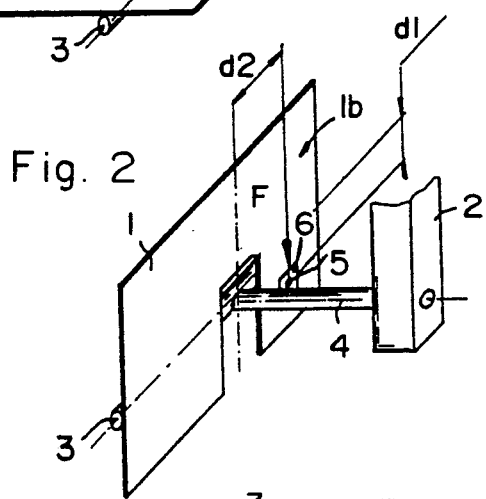
Figure 3:
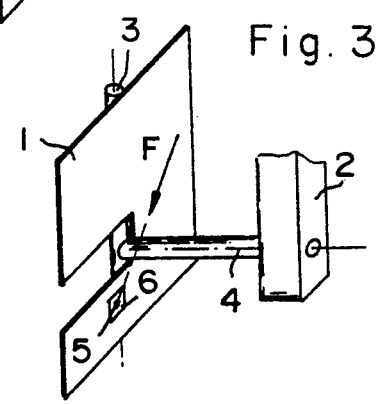

In accordance with FIGS. 1 to 3, force F pushes on the platform by means of an articulation 5, or as a stop at a point 6 situated near the operative arm 2 at respective distances d1 and d2 from the lifting axle 3 and the retracting axle 4. In FIG. 1, platform 1 is in its horizontal operative position and the force F is applied perpendicularly to it, either at the level of the articulation 5 or at the level of the stop 6. In this position, the lifting axle is horizontal, the thrust exerted by the force F, in accordance with FIG. 2, causes the lateral raising of the platform 1 which is thus brought to an intermediate vertical position. According to the invention, the distance d2 is such that the moment of force F, in this first phase, is insufficient to cause the rotation of the platform 1 and its lifting axle 3 around the retracting axle 4. According to FIG. 3, the intensity of the force F, which continues pushing in the same direction, is then increased so that the platform 1 and its lifting axle 3 are retracted edgeways towards the rear of the power tailgate.

Figure 4:
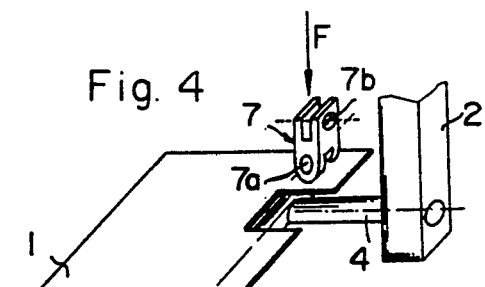
FIGS. 4 to 6 are partial perspective views showing the same power tailgate, in the same phases, equipped with lifting and retracting apparatus in accordance with a second embodiment.
Figure 5:
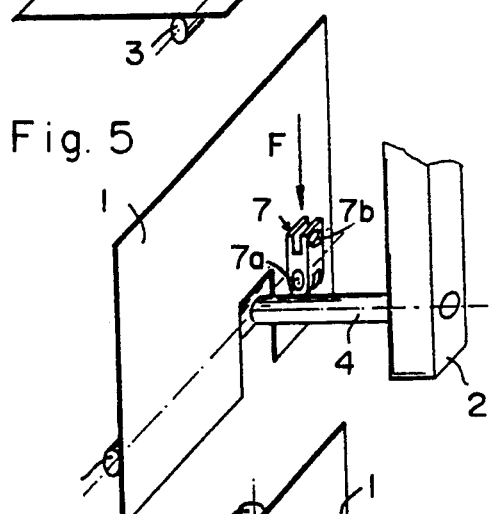
Figure 6:
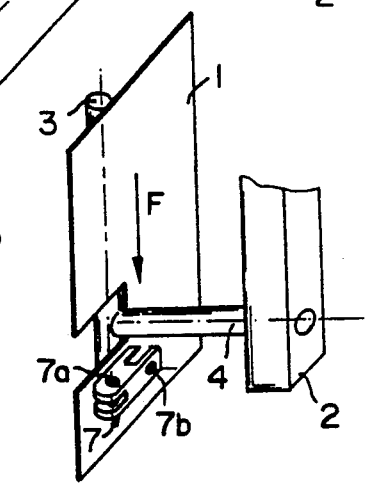

In FIGS. 4 to 6, the force F is applied by means of a cap 7 with two crossed axles 7a and 7b positioned on the platform 1 almost at the same place as the articulation 5 or the stop 6, with the crossed axles 7a and 7b being positioned parallel to the lifting axle 3 and the retracting axle 4 respectively. When the platform 1 is in operative horizontal position (FIG. 4), the cap 7 is generally orientated at right angles to the platform 1. The application of the force F on the cap 7 then causes the lateral lifting of the platform 1, the cap 7 swivelling round its axle 7a, and reaching a plane parallel to the front of the platform 1, which is then in its intermediate vertical position on the side of the operative arm 2 (FIG. 5). The position of the axle 7a in relation to the axle 7b defines a new point of application of force F, situated at the same distance d2 of the retracting axle 4 as its original point of application, the intensity of the force F increasing to cause the retraction edgeways of platform 1 and its lifting axle 3 towards the back of the power tailgate (FIG. 6).

Figure 7:
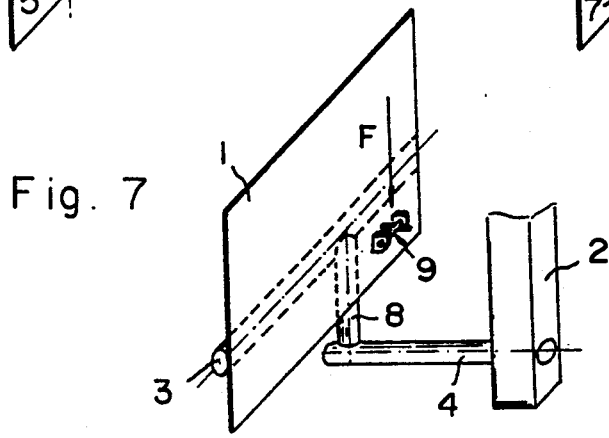
FIG. 7 is a partial perspective view of a power tailgate for which the tipping and swivelling axles are not coplanar.

In a last operative form, shown in FIG. 7, the tipping axle 3 and the swivelling axle 4 are not coplanar, but connected to an intermediate shaft 8, force F being applied to the platform 1 by means of a ball-joint or a universal joint 9.

I claim:

1. Process for lifting and retracting a platform laterally held at one of its sides by an operative arm, said process comprising:

laterally lifting the platform from a substantially horizontal position to an intermediate substantially vertical position during a first phase by swivelling the platform around a horizontally positioned lifting axle with the platform being located in a substantially vertical plane; and swivelling the platform and the lifting axle around a retracting axle during a second phase, the retracting axle being at right angles to the operative arm and at an angle to the lifting axle, to swivel the platform substantially vertically within said substantially vertical plane passing through the intermediate substantially vertical position to a substantially vertical storage position.

2. The process according to claim 1, wherein said steps of laterally lifting the platform and swivelling the platform comprise applying a variable force at a location of the platform situated at a first distance from the lifting axle, and at a second distance from the retracting axle.

3. The process according to claim 2, wherein the variable force is initially applied during the first phase to cause the platform to swivel around the lifting axle to the intermediate substantially vertical position, without being sufficient to cause the platform and the lifting axle to swivel around the retracting axle.

4. The process according to claim 3, wherein the variable force is increased during the second phase to cause the platform to swivel to the substantially vertical storage position.

5. The process according to claim 2, wherein the variable force comprises a pushing force applied at a location on a top portion of the platform.

6. The process according to claim 4, wherein the variable force comprises a pushing force applied at a location on a top portion of the platform.

7. The process according to claim 2, wherein the variable force comprises a pulling force applied at a location on a bottom portion of the platform.

8. The process according to claim 4, wherein the variable force comprises a pulling force applied at a location on a bottom portion of the platform.

9. The process according to claim 2, wherein the first distance from the lifting axle is situated between the lifting axle and the operative arm, and the second distance from the retracting axle is located at a portion of the platform that downwardly retracts during the second phase.

10. The process according to claim 1, wherein the angle between the retracting axle and the lifting axle is 90°.

11. The process according to claim 1, wherein the platform is part of a power tailgate.

12. The process according to claim 1, wherein said retracting axle is substantially horizontal.

13. Apparatus for lifting and retracting a platform laterally held at one of its sides by an operative arm, said apparatus comprising:
    an operative arm;
    a lifting axle;
    a platform rotatably mounted on said lifting axle, with said platform being rotatable by application of force thereon from a substantially horizontal position to an intermediate substantially vertical position with the platform being located in a substantially vertical plane during a first phase by swivelling of said platform around said lifting axle that is horizontally positioned during the first phase; and
    a retracting axle positioned at an angle to said lifting axle and at a right angle to said operative arm, said platform and said lifting axle being rotatable, during a second phase, around said retracting axle to rotate said platform substantially vertically within said substantially vertical plane passing through said intermediate substantially vertical position to permit swivelling of said platform to a substantially vertical storage position.

14. The apparatus according to claim 13, comprising means on said platform for application of a force to effect rotation of said platform around said lifting axle and said retracting axle.

15. The apparatus according to claim 14, wherein said means on said platform for application of a force comprise an articulation.

16. The apparatus according to claim 14, wherein said means on said platform for application of a force comprise a stop.

17. The apparatus according to claim 14, wherein said means on said platform for application of a force comprises a cap including two cross axles for applying force to said platform.

18. The apparatus according to claim 14, wherein said means on said platform for application of a force comprises a ball-joint for applying force to said platform.

19. The apparatus according to claim 14, wherein said means on said platform for application of a force comprises a universal joint for applying force to said platform.

20. The apparatus according to claim 13, wherein said lifting axle and said retracting axle are coplanar.

21. The apparatus according to claim 13, wherein said lifting axle and said retracting axle are not coplanar.

22. The apparatus according to claim 13, wherein said angle between the retracting axle and the lifting axle is 90°.

23. The apparatus according to claim 13, including an intermediate shaft between said lifting axle and said retracting axle.

24. The apparatus according to claim 13, wherein said retracting axle is substantially horizontal.

* * * * *